Patented Oct. 16, 1934

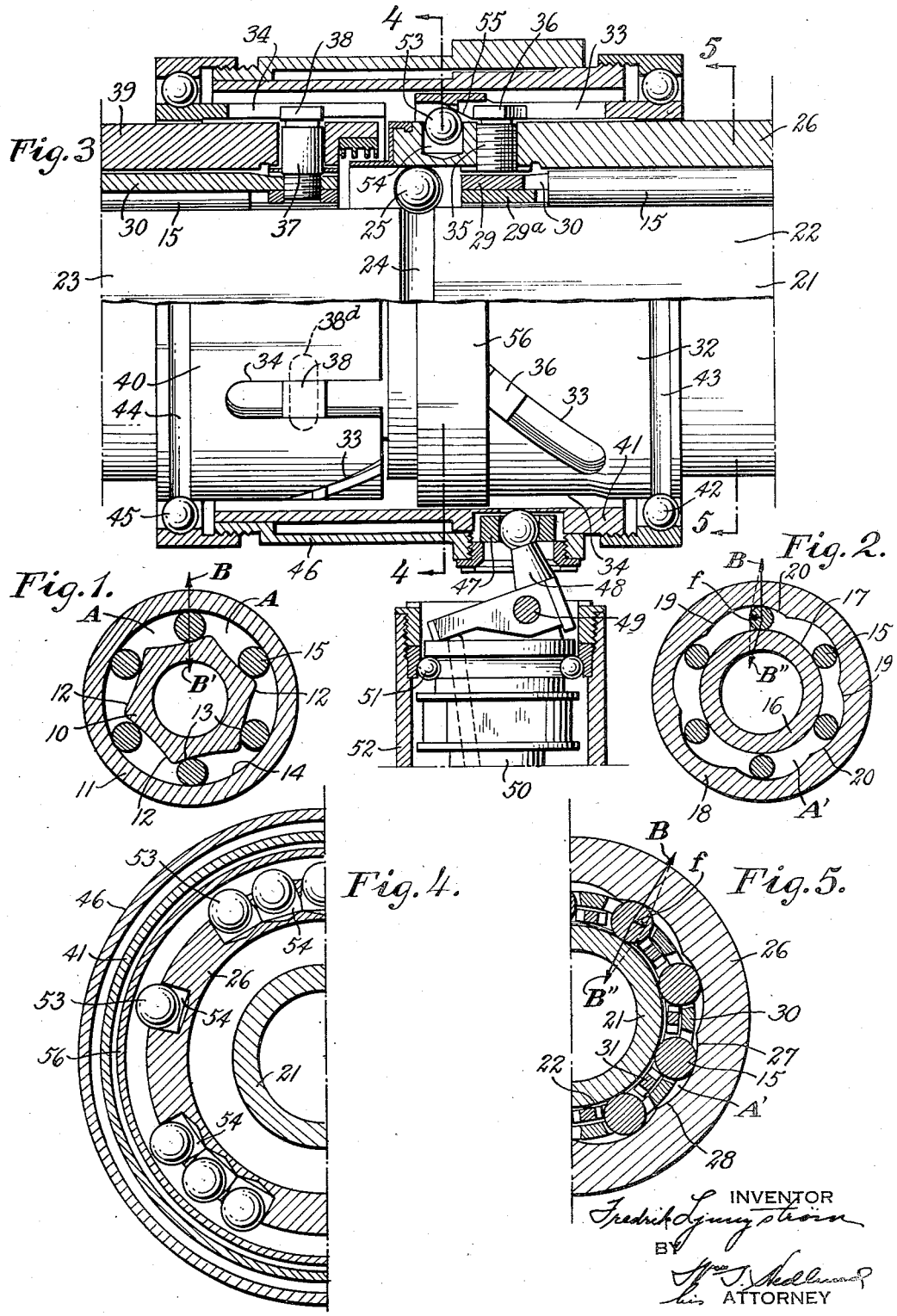

1,976,791

UNITED STATES PATENT OFFICE 1,976,791

FRICTION CLUTCHING DEVICE

Fredrik Ljungström, Stockholm, Sweden, assignor, by mesne assignments, to Ped, Incorporated, New York, N. Y., a corporation of Delaware Application February 26, 1931, Serial No. 518,379
In Germany February 28, 1930

4 Claims. (Cl. 192—44)

The present invention relates to friction coupling devices and has particular reference to that type of friction coupling device through which power is transmitted by means of one or more gripping detents adapted to frictionally engage friction gripping surfaces angularly disposed with respect to each other on separate clutch elements.

In devices of this character in which the detents and the clutch elements which they engage rotate, the detents are subjected to centrifugal force and in some forms of clutches the resultant force or forces due to centrifugal force tend to move the gripping detents out of their proper engaging position.

A primary object of the present invention is to provide means whereby undesirable forces tending to move the gripping detents out of their proper operative positions are opposed by other forces tending to counteract them. In accordance with the present invention, the opposing forces are preferably derived due to action of centrifugal force, since the magnitude of the undesirable forces varies in accordance with the speed of operation of the clutch and by generating the opposing forces through the action of centrifugal force, the magnitude of these forces will automatically vary in the same way that the magnitude of the undesirable forces varies.

The invention has particular application in clutching devices of the character disclosed in United States Patents Nos. 1,810,282 and 1,810,283 granted to me June 16, 1931 and by way of example, the present invention is illustrated herein as applied to a clutch structure of the general type disclosed in said patents. It is to be understood, however, that the invention is not limited to use in clutches of the specific type illustrated but may be used equally well in other types of clutching devices.

The more specific nature of the invention and the manner in which the above stated primary object and more detailed objects may be attained may best be understood from a consideration of the ensuing description of a form of clutch embodying the invention and illustrated in the accompanying drawing forming a part of this specification.

In the drawing:

Fig. 1 is a more or less diagrammatic cross-section of one form of clutch of the general type referred to;

Fig. 2 is a similar cross-section of a type of clutch productive of the undesirable forces which are compensated for in accordance with the present invention;

Fig. 3 is a longitudinal elevation, partly in section, of a clutch structure embodying the present invention and of the type adapted to be employed in a transmission of the character disclosed in the above mentioned patents;

Fig. 4 is a transverse half-section taken on the line 4—4 of Fig. 3; and

Fig. 5 is a transverse half-section taken on the line 5—5 of Fig. 3.

Turning now more particularly to Fig. 1, the clutch diagrammatically illustrated therein comprises an inner clutch member 10 and an outer clutch member in the form of a sleeve 11. The member 10 is provided with a plurality of gripping surfaces 12 and 13 and the member 11 is provided with an inner cylindrical gripping surface 14. As will be evident from the figure, the gripping surfaces of the two members provide a series of wedge shaped spaces A between the two clutch members. In each of these spaces A there is disposed a gripping detent 15 in the form of a roller. This construction is of known form and provides a reversible overrunning clutch for the transmission of power beween the two clutch members. With the detents arranged as shown in the figure, power will be transmitted, for example, from the member 10 to the member 11 upon rotation of member 10 in counter-clockwise direction as viewed in the figure and the clutch will overrun if the member 11 tends to rotate at a higher speed than the member 10. Obviously, if the detents are shifted peripherally with respect to member 10 so that they engage surfaces 14 and 12, the direction of rotation in which power is transmitted by the detents will be reversed as will also the direction with respect to which the member 11 can overrun relative to member 10.

When the parts are rotating it will be evident that the detents 15 are subjected to centrifugal force tending to throw them radially outwardly in the direction indicated by the arrow B. The tendency of the detents to move in this direction is resisted by a reaction force acting in the direction indicated by the arrow B'. Due to the fact that the surface 14 of member 11 is concentric with respect to the axis of rotation of the clutch, the forces acting on the detents due to centrifugal force and the reaction forces, are in alignment, as indicated by arrows B and B' and consequently no resulting force is set up tending to move the detents peripherally.

Fig. 2 illustrates a clutch operating in accordance with the same principle as the clutch disclosed in Fig. 1. In this clutch, however, the inner clutch member 16 is provided with an external cylindrical surface 17 and the outer clutch member 18 is provided with two series of gripping surfaces 19 and 20. The arrangement of surfaces 17, 19 and 20 provides a series of pockets A' corresponding to the pockets A in Fig. 1, in which are located roller detents 15.

The action of this clutch in transmitting power and in overrunning is the same as that previously described and need not be discussed in detail. If we assume rotation of the clutch shown in the present figure, it will be evident that the detents 15 will be subjected to centrifugal force tending to throw them radially outwardly in a direction indicated by arrow B. In this instance, however, the reaction force will not act radially due to the fact that the gripping surfaces on the outer clutch member are not concentric with respect to the axis of rotation of the clutch. With the parts in the position illustrated in the figure, the reaction force will act in the direction indicated by arrow B'' and as a consequence, there will be set up a force component acting peripherally and indicated by the arrow $f$ in the figure. It is evident that this force component will tend to cause the detent to move out of the wedge shaped space provided between surfaces 17 and 19, thereby tending to cause disengagement of the detent. In accordance with the present invention, means is provided for applying an opposing force in such a manner as to counteract the effect of the undesirable peripheral force component $f$.

Turning now to Fig. 3, I have illustrated a clutch assembly comprising two reversible clutches of the type shown in Fig. 2. In the arrangement shown, the clutches are disposed in axial alignment with respect to each other and have a common inner clutch member 21 having cylindrical surfaces 22 and 23 separated by a groove 24 which provides an inner race for a series of bearing balls 25. The right hand clutch comprises in addition to the inner member 21, an outer member 26 (see also Fig. 5) having inner gripping surfaces 27 and 28. Surfaces 22, 27 and 28 provide between them a series of pockets A' in which are located the roller detents 15. Roller detents 15 are situated in a cage indicated generally at 29 and having axially extending cage bars 30, there being one bar between each two adjacent detents 15. Radially inside each of the cage bars 30 there is mounted an axially extending spring member 31, the ends of which are situated in suitable notches (not shown) in the end rings 29a of the cages. It will be evident that by turning the cages relative to the outer clutch member 26, the detents 15 will be forced against either one or the other of the series of gripping surfaces 27 or 28. In Fig. 5 the cage is shown turned so that the spring members 31 act to force the detents into gripping engagement with the surfaces 22 and 27, thus providing for drive through the clutch in counter-clockwise direction as viewed in this figure.

As previously noted, the clutch illustrated is of the reversible type and reversal of the clutch is effected by shifting the clutch cage 29 clockwise with respect to the outer clutch member 26 so that the detents 15 engage the surfaces 22 and 28. Shifting of the rollers relative to the outer clutch member is effected by axial shifting movement of a sleeve member 32 which is provided with a series of angularly disposed slots 33 and a series of axially disposed slots 34. The outer clutch member 26 has secured therein a number of studs 35 having square heads 36 disposed in the angularly disposed slots. A second series of studs 37 project radially from the detent cage 29 and are provided with square heads 38 situated in the axially disposed slots 34. In Fig. 3, the studs 35 projecting from the clutch member 26 are shown and the studs 37 projecting from the cage 29 are illustrated in the section of the left hand clutch comprising the portion of the inner member 21 providing the surface 23 and the outer clutch member 39 which is similar to the clutch member 26. Studs 37, the heads 38 of which engage the axial slots 34, pass through peripherally extending slots in the outer clutch members, one of such slots being indicated by dotted lines at 38a. It will be understood, however, that the slotted sleeve member 32 of the right hand clutch and the similarly slotted sleeve member 40 of the left hand clutch each engage two sets of radially extending studs, one set of which is fixed to the clutch cage and the other set of which is fixed to the outer clutch member in the respective clutches. Assuming the outer clutch member 26 to be stationary, it will be evident from Fig. 3 that shifting of the clutch sleeve to the left from the position shown in the figure will cause the sleeve to turn in clockwise direction as viewed from the right of Fig. 3, because of the sliding of the heads of the studs 35 in the oblique slots 33. Such clockwise movement of sleeve 32 will result in moving the studs in the axially disposed slots 34 in clockwise direction, and since the studs in the axial slots 34 are secured to the clutch cage it will be evident that the clutch cage and the rollers 15 will be shifted relative to part 26 from the position shown in Fig. 5 to a position in which the rollers are in gripping contact between surfaces 22 and 28.

Similarly axial movement of the sleeve 40 will cause relative peripheral movement between the series of studs engaging the slots 33 and the series of studs engaging the slots 34.

For use in transmissions of the type disclosed in the patents previously referred to, the clutches are set to grip and to overrun in opposite directions, that is, if the detents are set to grip between the surfaces 22 and 27 in the right hand clutch in Fig. 3, the detents are set to grip between surfaces 22 and 28 in the left hand clutch. With the clutches set in this manner, they operate to segregate alternate opposite turning moments applied to the clutch member 21 and to transmit turning moments in one direction to the clutch member 26 and to transmit turning moments of opposite direction to the clutch member 39. To concurrently reverse the clutches, sleeve members 32 and 40 are advantageously shifted simultaneously in axial direction. In the clutch illustrated, the means for this simultaneous shifting of these members comprises a shift sleeve 41 providing the outer race for a series of bearing balls 42, the inner race for which is provided by the groove 43 in member 32. It will be evident that the shift sleeve 41 may remain rotationally stationary while the member 32 rotates and that through the medium of balls 42 axial movement imparted to shift sleeve 41 may be transmitted to member 32. Member 40 of the other clutch is grooved at 44 to provide the inner race for the second series of balls 45 the outer race for which is provided by a second shift sleeve 46 slidably mounted around shift sleeve 41. Sleeves 41 and 46 are interconnected by means of an element 47 engaged by one arm of a bell crank lever 48 which is pivotally mounted at 49 in a rotatable shaft member 50 supported as by bearing balls 51 in a stationary housing member 52. It will be understood that the clutch structure illustrated in Fig. 3 is rotatably supported in fixed relation with respect to the housing member 52 and shaft 50. Due to the fact that the bell crank member 48 is offset with respect to the axis of rotation of shaft 50, it will be evident that if this shaft is turned through a half revolution from the position shown in Fig. 3, the shift sleeves 41 and 46 will be moved axially to the left in Fig. 3 to effect reversal of the clutches.

The general arrangement of the clutches and the means for effecting reversal thereof is described in detail in the patents referred to and for the purposes of the present invention need not be described in further detail herein.

From Fig. 5 it will be evident that the forces acting in the directions of the arrows B and B'' will produce a peripheral force component $f$ tending to move the detents 15 out of their operative positions against the action of the springs 31 tending to hold them in position. The magnitude of the force component $f$ will vary with the speed of operation of the clutch. If we now consider both Figs. 3 and 5, we find that the tendency of the force component $f$ is to move the detents in clockwise direction with respect to the outer clutch member 26. This direction of movement is the same as the direction of movement for effecting reversal of the clutch and it will be remembered that reversal of the clutch is effected by moving the sleeve 32 axially to the left as viewed in Fig. 3. Consequently, the force component $f$ tending to move the detents peripherally will tend to move sleeve member 32 to the left as viewed in Fig. 3.

In the present embodiment, the tendency of the force component $f$ to move the detents out of engagement with the gripping surfaces on the clutch members is opposed by a force separately produced due to centrifugal force and tending to move member 32 to the right as viewed in Fig. 3. The means for producing this force comprises a plurality of balls 53 arranged in a series of radially extending recesses 54 formed in the clutch member 26, and adapted to be forced outwardly under the influence of centrifugal force so as to engage an inclined surface 55 on the annular ring like portion 56 of the member 32. From Fig. 3 it will be apparent that as balls 53 move radially outwardly under the influence of centrifugal force, the pressure exerted thereby on the inclined surface 55 will produce a force component acting to shift member 32 to the right as viewed in Fig. 3 and it will be equally apparent that the provision of this force component will serve to oppose the undesirable force component $f$ tending to move member 32 in the opposite direction. By suitably selecting the number and weight of the balls 53, having consideration for their distance from the center of rotation of the clutch, the force component $f$ tending to move the detents from their gripping positions can be completely neutralized by the force component produced by centrifugal force acting on the balls.

If the right hand clutch is reversed so that the detents engage surfaces 22 and 28, the direction of the force component $f$ will be opposite the direction shown in Fig. 5 and this force component will tend to move the sleeve 32 to the right as seen in Fig. 3. If the clutch is reversed, however, member 32 will have been shifted to the left from the position shown in Fig. 3 so that the balls 53 will be within the cylindrical portion of the sleeve and will have no tendency to move this member axially due to centrifugal force on the balls. Under such conditions, the force component $f$ will not be opposed by any force due to the action of the balls 53, but ordinarily it is not necessary to neutralize or compensate for the force component $f$ when the clutch is in reversed position since ordinarily a clutch is not operated for as long a period or at as high a speed in its reversed direction of drive as it is in its normal forward direction of drive. This is particularly true in the case of clutches employed in a vehicle transmission. It will be understood, however, that in applications where a clutch is likely to be operated under substantially the same conditions in both directions, a second series of balls 53 may be employed to create a force opposing the force component $f$ which is produced under conditions of drive in reverse direction.

In the embodiment illustrated, the clutch member 26 is adapted to be connected to a driven shaft, such, for example, as a propeller shaft of an automobile, while the clutch member 39 is adapted to be connected to a fixed abutment. When the clutches are utilized in this manner, the clutch member 39 and the detents 15 associated therewith do not rotate and are therefore not subjected to the action of centrifugal force. Consequently, the undesirable force component $f$ is not produced in the left hand clutch and there is no necessity for providing any counteracting force in this clutch.

As will be observed from Fig. 4, the balls 53 are not uniformly distributed circumferentially of the clutch member 26. The sole reason for the distribution of the balls shown in this figure is to have them arranged so that when the sleeve member 32 is shifted axially to the left from the position shown in Fig. 3 to effect reversal of the clutch, none of the balls will be situated directly inside any portion of the slots 33 and 34 in member 32, through which slots the balls would be thrown outwardly by centrifugal force. In other words, the balls are distributed peripherally so that the solid portions of the member 32 provide retaining surfaces for holding the balls in their recesses 54 when the sleeve member is shifted. Obviously, if means other than a slotted sleeve of the type of member 32 is employed to effect reversal of the clutch, the non-uniform distribution of the balls may not be required and it will be equally obvious that other means may be employed for preventing the balls from being thrown outwardly from their recesses, even if, in some positions of member 32, some of the balls are positioned directly under the slots.

While the invention has been described by way of example in connection with a clutch structure of relatively specific application, it will be evident that the invention may be availed of in clutches of many different specific forms adapted to be utilized in numerous different ways. The invention is therefore to be understood as being in no sense limited to clutches of the specific form herein illustrated but is to be considered as embracing all clutch structures falling within the terms of the appended claims when construed as broadly as is consistent with the state of the prior art.

Having thus described my invention, what I claim is:—

1. A device of the character described comprising an inner clutch member having a gripping surface, an outer clutch member having gripping surfaces formed to provide wedge-shaped spaces between said members, detents in said spaces adapted to frictionally grip said surfaces to transmit power from one to the other of said members, said detents tending to move from operative gripping position due to centrifugal force, means for moving said detents into operative gripping position comprising a cage having springs adapted to bear against said detents, means for moving said cage and auxiliary means comprising mass subjected to centrifugal force for applying to said cage a force neutralizing the tendency of the detents to move from operative gripping position.

2. A device of the character described comprising an inner clutch member having a gripping surface, an outer clutch member having gripping surfaces formed to provide wedge-shaped spaces between said members, detents in said spaces adapted to frictionally grip said surfaces to transmit power from one to the other of said members, said detents tending to move from operative gripping position due to centrifugal force, means for moving said detents into operative gripping position comprising a cage having springs adapted to bear against said detents, means for moving said cage comprising an axially shiftable sleeve and a control member for shifting said sleeve, and auxiliary means subjected to centrifugal force for applying a force to said sleeve neutralizing the tendency of the detents to move from operative gripping position.

3. A device of the character described comprising an inner clutch member having a gripping surface, an outer clutch member having gripping surfaces formed to provide wedge-shaped spaces between said members, detents in said spaces adapted to frictionally grip said surfaces to transmit power from one to the other of said members, said detents tending to move from operative gripping position due to centrifugal force, means for resiliently moving said detents into operative gripping position comprising a cage and yieldable means interposed between the cage and each of said detents, means for moving said cage to move said detents into operative gripping position and auxiliary means comprising mass subjected to centrifugal force for applying to said cage a force neutralizing the tendency of the detents to move from operative gripping position.

4. A device of the character described comprising an inner clutch member having a gripping surface, an outer clutch member having gripping surfaces formed to provide wedge-shaped spaces between said members, detents in said spaces adapted to frictionally grip said surfaces to transmit power from one to the other of said members said detents tending to move from operative gripping position due to centrifugal force, means for resiliently moving said detents into operative gripping position comprising a cage and yieldable means interposed between the cage and each of said detents, axially shiftable means for moving said cage and auxiliary means comprising mass subjected to centrifugal force for applying to the last mentioned means an additional force tending to move said last mentioned means so as to neutralize the tendency of the detents to move from operative gripping position due to centrifugal force.

FREDRIK LJUNGSTRÖM.